United States Patent Office 3,234,198
Patented Feb. 8, 1966

3,234,198
POLYMERIZATION PROCESS
John Boor, Jr., El Cerrito, Calif., and Frederick M. Fowkes, Williamstown, Mass., assignors to Shell Oil Company, New York, N.Y., a corporation of Delaware
No Drawing. Filed Dec. 10, 1962, Ser. No. 243,608
7 Claims. (Cl. 260—94.3)

This invention relates to the polymerization of diolefins. More particularly, it relates to improved processes for the homogeneous polymerization of conjugated diolefins such as butadiene and isoprene.

Workers in the polymerization art have recently been successful in polymerizing 1,3-butadiene and isoprene under conditions which permit the monomer to polymerize to an elastomer containing a high proportion above about 95% of the cis-1,4 polymer structure. It has been found that polymers having this configuration can be cured to useful rubbers which may be employed with advantage in many commercial applications such as the manufacture of tires. These synthetic rubbers are superior to natural rubber in resilience, low temperature flexibility, set and abrasion resistance. Small differences in cis-1,4 content have a powerful effect upon the crystallinity and hence the commercial acceptability of such synthetic rubbers.

It is known that the crystallinity of elastomers increases significantly with their stereoregularity. It is also believed that the primary strength properties of rubbery polymers such as tensile strength, tear resistance, and the like, improve with increasing crystallinity. The primary strength properties are important to the practical utility of such polymers. The improvements resulting from high crystallinity are most important for the practical utility of both gum and reinforced vulcanizate, particularly at elevated temperatures. They also tend to improve milling characteristics of the polymer.

One of the advantages of the present invention is that it permits the production of polymers of conjugated dienes having an exceptionally high cis-1,4 content in reproducible fashion. It has been found that polydienes having this preferred structure, produced with the catalysts described below, tend to have average molecular weights which are within the desirable range for good processability, contrasted to other stereospecific catalysts which promote the formation of polymers having excessively high average molecular weights. The measurement generally employed as an indication of average molecular weight is intrinsic viscosity (I.V.), determined in toluene at 25° C., expressed in deciliters per gram (dl./g.). The most desirable I.V. for commercially useful polydienes is between 2 and 10, most preferably 2 and 8. Polybutadiene is preferably in the lower part of this range, while polyisoprene preferably has higher average molecular weights.

Now, in accordance with the present invention, it has been found that dienes may be polymerized to elastomers by homogeneous polymerization in a hydrocarbon solvent, the catalyst for such polymerization being a hydrocarbon, soluble reaction product of a cobalt or titanium aryl sulfonate with an aluminum alkyl compound. More particularly, the process of the present invention comprises the formation of a hydrocarbon-soluble reaction product between a cobalt or titanium chloride with an aryl sulfonic acid, which reaction product is in turn reacted with, i.e., reduced by an aluminum alkyl compound, preferably an aluminum alkyl sesquichloride.

Briefly restated, this invention comprises a process for the polymerization of dienes, preferably conjugated dienes, in a non-aqueous hydrocarbon solution containing catalytic polymerizing amounts of the particular hydrocarbon soluble catalysts referred to above. In the case of the cobalt compounds, the reaction product will comprise essentially the reaction product of a cobalt aryl sulfonate with an aluminum alkyl compound, particularly an aluminum alkyl sesquichloride in which the alkyl radicals contain 1–4 carbon atoms each. The titanium compounds with which the present invention is also concerned comprise the corresponding titanium reaction products but will probably be constituted of a molecular complex of a titanium chloride and an aryl sulfonic acid which in turn is reacted with an aluminum alkyl compound.

The process comprises polymerizing a conjugated diene at a temperature within the range from about −40 to about 100° C. in a hydrocarbon solution containing the essential catalysts. Mixtures of conjugated dienes or mixtures of conjugated dienes with copolymerizable monomers may be utilized in the invention as long as about 25% by weight of the monomer mixture comprises a conjugated diene. The catalyst employed in the present invention may (and probably will) comprise mixtures of more than one catalytic species either with respect to the proportion of cobalt or titanium in the ultimate reaction product or with respect to the mixture of cobalt and titanium therein.

The most desirable catalysts for use in the process of the present invention are prepared by the prior reaction of substantially anhydrous catalyst components. Thus, essentially anhydrous cobalt chloride may be reacted with an aryl sulfonic acid, preferably an alkylated naphthalene sulfonic acid, particularly those in which at least 1 and preferably 2–4 alkyl radicals having from 6 to 18 carbon atoms each are directly attached to the naphthalene nucleus. In the preparation of cobalt dinonyl naphthalene sulfonate, for example an alcoholic solution of cobaltous chloride is passed through an ion exchange resin column so as to deposit the cobaltous chloride therein. A 3:1 volume mixture of benzene and ethanol is utilized to dissolve barium dinonyl naphthalene sulfonate and the solution thereof is then passed through the exchange column. The eluted material contains cobalt dinonyl naphthalene sulfonate since during the elution an exchange between cobalt and barium cations occurs. Preferably the solution of cobalt dinonyl naphthalene sulfonate is freeze dried to isolate the powdered cobalt salt.

The titanium complexes which may be used in place of or in addition to the cobalt salts may be prepared by the addition of an alkane (e.g., heptane) solution of dinonyl naphthalene sulfonic acid to a titanium chloride which may be either or both titanium trichloride or titanium tetrachloride. The reaction mixture is allowed to stand preferably at a temperature between about 0 and 60° C. for 1–48 hours to permit evolution of HCl. The product may be purified if desired by freeze drying to remove solvent and volatile reaction products.

The mol ratio of cobalt or titanium to sulfonic acid may be varied within relatively wide limits. Preferably the mol ratio of sulfonic acid to metal chloride utilized in forming the primary reaction product is between about 0.25 and 5, usually between about 1 and 4. This includes single species and also mixtures of primary reaction products such that the average is within the above defined limits. If chlorine is substantially absent from the primary reaction product, then it may be assumed that the primary reaction product is a true salt of the metal and the aryl sulfonic acid. If, however, chlorine is present in appreciable amounts, then it is believed that the primary reaction product is properly referred to as a complex between the metal halide and the aryl sulfonic acid. For example, a complex of titanium trichloride and dinonyl naphthalene sulfonic acid may be employed. It is preferred that the products be essentially anhydrous, although amounts of water between about 0.25 and 7 mols of water per mol of titanium halides may be present therein. Also, it is preferred that the reaction product be purified to remove oxygenated compounds other than sulfonates or sulfonic acid since the production of low molecular weight elastomers is promoted by their presence in the polymerization mixture.

The aluminum alkyl compounds may be added prior to the polymerization reaction or may be added intermittently or continuously during the polymerization. Preferably, it is added prior to reaction so as to insure complete solubility (or at least highly colloidal dispersion) of the catalyst compounds thus promoting the high cis content of the polymers derived by the use of the specific catalyst systems.

The catalyst may comprise one or more aryl sulfonate species. Dicyclic aryl sulfonates are preferred such as those having a naphthalene nucleus and preferably an alkylated naphthalene nucleus. Suitable nuclei to which at least one sulfonic acid radical is attached include particularly decyl naphthalene, nonyl naphthalene, didecyl naphthalene, dinonyl naphthalene, dioctyl naphthalene, ethyl dodecyl naphthalene, octadecyl benzene, hexadecyl toluene, and related species wherein the aryl nucleus contains one or two cyclic rings which are preferably used, as in the naphthalene nucleus. The sulfonic acid radicals may be from one to three in number per aryl nucleus. Usually mixtures of aryl sulfonic acids are utilized for economic reasons. However, in special instances, it may be possible to obtain at reasonably low cost individual species for use in the process of this invention.

The polymerization of conjugated dienes according to this invention is carried out in solution with a non-aqueous diluent, preferably a hydrocarbon. Aromatic hydrocarbons are preferred diluents although they may be mixed with aliphatic hydrocarbons as long as about 10% of aromatic hydrocarbon is present. Good results are also obtained with mixtures of liquid hydrocarbons wherein only a portion is aromatic or cyclic hydrocarbon. The use of benzene as a sole diluent is a particularly preferred embodiment in the polymerization of butadiene with the present catalyst systems of the invention. However, for the purpose of promoting chain transfer and therefore controlling molecular weight, it is also advisable to incorporate an olefin such as butenes or amylenes in the reaction mixture. Other cyclic hydrocarbons that may be employed as diluents in addition to or in place of benzene include toluene, xylene, mesitylene, ethyl benzene and other normally liquid cyclic compounds which are not readily subject to polymerization by the catalyst of this invention. Suitable hydroaromatic diluents include cyclohexane and alkyl substituted cyclohexanes. Aliphatic hydrocarbons which may be employed as diluents together with a cyclic hydrocarbon include hexane, octane, isooctane and the like.

The amount of benzene or other aromatic hydrocarbons present with an aliphatic diluent should be sufficient to maintain the resulting elastomeric polymer in solution in the reaction mixture. This is readily determined in each instance and varies with the amount of polymer formed, the temperature, the individual monomer species and the individual aliphatic solvent. For example, with butene as solvent, 8-10% of benzene is generally sufficient. Butanes may require admixture of 25-35% of benzene.

While the most preferred monomers to be polymerized by use of the presently described catalyst system are butadiene and isoprene, other conjugated dienes may be so treated either alone or in conjunction with either (or both) isoprene or butadiene. These include for example, piperylene, 2,3-dimethyl butadiene-1,3; 2-ethyl-butadiene; 2-isopropyl-butadiene-1,3; cyclopentadiene-1,3; and others.

The aluminum alkyl compounds to be used in combination (reaction) with the above-described cobalt or titanium aryl sulfonates, include particularly the aluminum trialkyls, aluminum dialkyl chlorides, aluminum alkyl dichlorides and most preferred the aluminum alkyl sesquichlorides. The alkyl radicals in any of these subgeneric species include especially those having from 1-10 carbon atoms such as methyl, ethyl, propyl, isopropyl, normal butyl, isobutyl, octyl and the like. In the preferred embodiments, the lower alkyls having from 1-4 carbon atoms each are preferred, with ethyl being optimum. Typical species to be utilized include aluminum triethyl, aluminum triisopropyl, aluminum tributyl, aluminum methyl sesquichloride, aluminum ethyl sesquichloride, aluminum isopropyl sesquichloride, aluminum ethyl dichloride, aluminum diethyl chloride and the like. The proportion of aluminum compounds may be varied to control the desired type of polymer product obtained thereby. Normally, the mol ratio of aluminum alkyl compounds to the cobalt or titanium compounds will be between about 0.75 and about 20, the preferred mol ratio being between about 1 and 4.

The proportion of catalyst present in the polymerization system may be ascertained by experts in the art for each particular system being employed. This will usually be between about 0.3 and about 1200 parts per million based on the total reaction mixture. Expressed in other terms, it is between about 0.005 and about 20 millimoles per liter solution.

The time of reaction will vary between about ¼ and 48 hours and generally will extend between about 1 and 8 hours, within the reaction temperature range specified hereinbefore. When utilizing the titanium reaction products as the catalyst component, it is preferred to employ the sesquichloride in conjunction therewith, since optimum activity is obtained thereby. With the cobalt aryl sulfonates, however, it is possible to utilize any of the types and species of aluminum alkyl compounds referred to above.

The process is preferably conducted in an inert atmosphere and with a minimum of water present. Preferably the system is completely anhydrous and completely free of oxygen insofar as each of these conditions is practically possible. The inert atmosphere may be obtained, for instance, by first sweeping out the reaction zone with an inert gas such as nitrogen, methane and the like. It is important to use extremely effective drying methods for the preparation of each of the feed components such as distillation, or passage through beds of molecular sieves or calcium hydride, as well as a combination of several drying steps to reduce the water content of all components to a value which is preferably no more than about 5 parts of water per million of feed. This permits maintaining an accurately controlled reaction for a predetermined molecular weight of the product. Under some conditions, however, controlled amounts of water may be injected purposely into the system in amounts between two and fifty parts per million based on the feed components so as to control molecular weight and stereoconfiguration.

The reaction mixture is preferably agitated during the course of the reaction as by rocking or by use of suitable stirrers such as magnetically actuated stirrers. Furthermore, the reactor is preferably equipped with suitable inlets for feeding the monomer and a set of inlets and outlets for circulating an inert gas to purge air from the vessel. A separate inlet may be supplied whereby catalyst may be added prior to or during the course of the reaction. If continuous operations are to be employed, then the inlet for catalyst and solvent are necessary as well as an outlet for the continuous withdrawal of polymer solution.

At the completion of the reaction, the mixture is treated to deactivate the metal catalyst. The reaction may be terminated by adding an alcohol to the reaction mixture. Methanol, ethanol and higher alcohols are suitable.

The polymers prepared by the process of this invention may have widely varying average molecular weights depending upon the extent of the polymerization and the conditions employed therein. The elastomers are useful in the preparation of molded rubber articles such as tires, tubes, belts and the like as well as in the preparation of latices, foams and may be used in impregnating and coating compositions. They may be formulated with plasticizers, extending oils, vulcanizing agents, pigments, carbon black and the like as well as with sulfur and sulfur compounds, all within the skill of the rubber art.

In determining the microstructure of the polymers, infrared analysis was made of a film which was prepared by evaporating a 1% solution of polymer in benzene to dryness on a salt plate in the aperture of a standard plate holder. The film was scanned in the infrared instrument using the absorbances at 10.35, 11.0 and 13.60 microns for trans-1,4; trans-1,2 and cis-1,4 structure respectively.

Catalysts 2, 4, and 6 were utilized in the polymerization of isoprene, the cocatalyst being aluminum ethyl sesquichloride at a mol ratio of 1/1. These all produced polyisoprene having a cis-1,4 content in the range of 95–96.5%. The activity dropped rapidly as the aluminum/titanium mol ratio was increased to 2/1 and higher.

Catalysts 1, 3, and 5 were most active at aluminum/titanium mol ratios of 4/1. Their activity dropped rapidly at lower and higher ratios.

The effect of catalyst concentration was studied utilizing catalyst No. 2 from Table I, Table II summarizes the data obtained in this respect and demonstrates a significant increase in the molecular weight of the polyisoprenes so obtained corresponding with a decrease in the catalyst/monomer ratio. No gel could be detected in any of the runs.

*Table II*

[Benzene, 30 mls.; isoprene, 5 mls.; room temperature]

| Exp. No. | Ti Catalyst No. 2 mmoles | Al Sesqui-Chloride mmoles | Reaction Time hrs. | Product |  |  |  |
|---|---|---|---|---|---|---|---|
|  |  |  |  | Yield, g. | Structure |  | Intrinsic Viscosity, dl/g. |
|  |  |  |  |  | cis 1,4 | 3,4 |  |
| 1 | 0.263 | 0.3 | 4 | 0.75 | 95.5 | 4.5 | 2.2 |
| 2 | 0.132 | 0.15 | 22.5 | 0.34 | 94.9 | 5.1 | 3.0 |
| 3 | 0.066 | 0.075 | 24 | 0.25 | 97.1 | 2.9 | 3.6 |

The following examples illustrate the use of the present invention and the preparation of the respective catalysts:

EXAMPLE I

A series of catalysts were prepared by reaction of titanium trichloride or tetrachloride with dinonyl naphthalene sulfonic acid, the method for the preparations being described hereinbefore. Table I lists the several catalysts prepared by this method, wherein the proportion of titanium chloride and identity of the chloride is varied with respect to the sulfonic acid. Water contents of some of the catalysts were also determined. Table I which follows gives the data obtained.

EXAMPLE II

Cobalt dinonyl naphthalene sulfonate was prepared as described hereinbefore and utilized in the polymerization of butadiene the aluminum alkyl compound being varied as shown by Table III which follows: The products obtained are also described in Table III.

*Table III*

Conditions: flask or bottle, nitrogen atmosphere, magnetic stirring
CODNNS = cobalt dinonyl naphthalene sulfonate[a]

| Reaction Variables |  |  |  |  |  |  |  | Product |  |  |  |
|---|---|---|---|---|---|---|---|---|---|---|---|
| Run | Alkyl | MA mmole | Cocat. | Cocat. mmole | Solvent | ml. | °C., hrs.[b] | g., Yield | cis |  | trans 1,4 |
|  |  |  |  |  |  |  |  |  | 1,4 | 1,2 |  |
| L163 | $Al_2Et_3Cl_3$ | 1.0 | CoDNNS[a] | .01 | Benzene | 91 | 25/1.5 | 4.2 | 96 | 1.9 | 2.0 |
| L164 | $Al_2Et_3Cl_3$ | 0.5 | CoDNNS[a] | .04 | do | 91 | 25/1.5 | 4.2 | High | | |
| L156 | $Al_2Et_3Cl_3$ | 2.0 | CoDNNS[a] | 0.10 | do | 100 | 25/1.5 | 7.0 | do | | |
| L155 | $Al_2Et_3Cl_3$ | 2.0 | CoDNNS[a] | 0.10 | do | 100 | 50/18 | 7.0 | do | | |
| L134 | $AlEt_3$ | 1.0 | CoDNNS[a] | 0.1 | Isooctane | 180 | 50/17 | 0.57 | Not examined. | | |
| L135 | $AlEt_2Cl$ | 1.4 | CoDNNS[a] | 0.1 | do | 180 | 50/17 | 3.4 | do | | |
| L136 | $Al_2Et_3Cl_3$ | 2.0 | CoDNNS[a] | 0.1 | do | 180 | 50/17 | 8.6 | do | | |

[a] $Co(C_{28}H_{43}SO_3)_2$.
[b] Temperature of reaction—duration of reaction.

What we claim as our invention:

1. A process for producing a polydiene which comprises polymerizing a conjugated diene at a temperature in the range from about −40 to about 100° C. in a hydrocarbon solution containing as an at least colloidally dispersed catalyst the reaction product of (A) an aluminum compound of the group consisting of aluminum

*Table I*

| Catalyst No. | Ti Compound Used in Prep. | Sulfonic Acid/Ti Compound | Apparent Comp. of Product | Water in Product percent w | Ti Moles/$H_2O$ Moles |
|---|---|---|---|---|---|
| 1 | $TiCl_4$ | 3.3 | $Ti(C_{28}H_{43}SO_3)_{2.4}Cl_{0.0}O_{1.3}C_6H_{12}$ | 1.0 | 1.42 |
| 5 | $TiCl_4$ | 2.6 | $Ti(C_{28}H_{43}SO_3)_{2.6}Cl_{0.0}O_{1.0}C_6H_{14}$ | N.D. | |
| 3 | $TiCl_4$ | 2.0 | $Ti(C_{28}H_{43}SO_3)_{2.0}Cl_{0.3}O_{1.0}C_6H_{13}$ | 0.8 | 2.05 |
| 2 | $TiCl_4$ | 1.0 | $Ti(C_{28}H_{43}SO_3)_{0.9}Cl_{1.9}O_{0.8}C_5H_8$ | 0.6 | 4.9 |
| 4 | $TiCl_4$ | 0.25 | $Ti(C_{28}H_{43}SO_3)_{0.78}Cl_{2.35}O_{0.8}C_3H_7$ | 0.5 | 6.7 |
| 6 | $TiCl_3$ | 0.48 | $Ti(C_{28}H_{43}SO_3)_{1.9}Cl_{1.0}O_{1.2}C_5H_{12}$ | 1.1 | 1.54 | trialkyls and aluminum alkyl halides with (B) the product of reaction between:
(a) a sulfonic acid species of the group consisting of
 (1) aryl metal sulfonates, and
 (2) aryl sulfonic acids,
with
(b) a metal chloride of the group consisting of
 (1) cobalt chlorides,
 (2) titanium chlorides,
the mole ratio of sulfonic acid species to metal chloride being between about 0.25 and 5, and the mol ratio of aluminum compound to the (B) product of reaction being between about 0.75 and 20, the catalyst being present in an amount between 0.005 and 20 millimoles per liter of the total reaction mixture.

2. A process according to claim 1 wherein the aryl sulfonic acid is an alkylated naphthalene sulfonic acid bearing at least one alkyl substituent having 6–18 carbon atoms.

3. A process according to claim 1 wherein A is an aluminum alkyl sesquichloride and B is the reaction product of a cobalt chloride and a dialkyl naphthalene sulfonic acid.

4. A process according to claim 3 wherein the diene is butadiene.

5. A process according to claim 1 wherein A is an aluminum sesquichloride and B is the reaction product of a titanium chloride and a dialkyl naphthalene sulfonic acid.

6. A process for the polymerization of butadiene which comprises dissolving butadiene in an inert hydrocarbon having 6–8 carbon atoms per molecule, said hydrocarbon having dissolved therein as catalyst the reaction product of cobalt dinonyl naphthalene sulfonate with aluminum ethyl sesquichloride and maintaining the solution to a polymerizing temperature between about —40° C. and about 100° C., whereby polybutadiene is produced.

7. A process for the polymerization of isoprene which comprises dissolving isoprene in an inert hydrocarbon having 6–8 carbon atoms per molecule, said hydrocarbon having dissolved therein as catalyst the reaction product of aluminum ethyl sesquichloride with a titanium chloride-dinonyl naphthalene sulfonic acid reaction product and maintaining the solution at a polymerizing temperature between about —40° C. and about 100° C., whereby polyisoprene is produced.

References Cited by the Examiner

UNITED STATES PATENTS 2,970,134  1/1961  Anderson _____ 260—94.3

FOREIGN PATENTS 905,099  9/1962  Great Britain.
36-17996  8/1962  Japan.

OTHER REFERENCES

Brewster, R.: Organic Chemistry, 3rd edition, Prentice-Hall (1961), page 674.

JOSEPH L. SCHOFER, *Primary Examiner.*